US012803256B2

(12) United States Patent
Yamaguchi

(10) Patent No.: US 12,803,256 B2
(45) Date of Patent: Nov. 17, 2026

(54) WIRE HARNESS FIXING DEVICE AND WIRE HARNESS

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Hiroshi Yamaguchi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 179 days.

(21) Appl. No.: 18/862,555

(22) PCT Filed: May 12, 2023

(86) PCT No.: PCT/JP2023/017823
§ 371 (c)(1),
(2) Date: Nov. 4, 2024

(87) PCT Pub. No.: WO2023/219149
PCT Pub. Date: Nov. 16, 2023

(65) Prior Publication Data

US 2025/0286358 A1 Sep. 11, 2025

(30) Foreign Application Priority Data

May 12, 2022 (JP) ................................. 2022-079035

(51) Int. Cl.
*H02G 3/32* (2006.01)
*B60R 16/02* (2006.01)
*F16B 9/02* (2006.01)

(52) U.S. Cl.
CPC ........... *H02G 3/32* (2013.01); *B60R 16/0215* (2013.01); *F16B 9/02* (2013.01)

(58) Field of Classification Search
CPC ........................................................ H02G 3/32
USPC ............................................................ 174/72
See application file for complete search history.

(56) References Cited

U.S. PATENT DOCUMENTS 6,464,181 B2 * 10/2002 Sakakura .................. F16L 3/23
248/68.1
2020/0070748 A1 * 3/2020 Kogure ............... B60R 16/0215

FOREIGN PATENT DOCUMENTS

JP H07-322449 A 12/1995
JP 10174259 * 6/1998
JP H10-174259 A 6/1998
JP 2011-229232 A 11/2011
(Continued)

OTHER PUBLICATIONS

International Search Report issued on Jun. 20, 2023 for WO 2023/219149 A1 (4 pages).

*Primary Examiner* — Stanley Tso
(74) *Attorney, Agent, or Firm* — LICA, Inc.

(57) ABSTRACT

A wire harness fixing device (13) includes a first holding member (20) that holds a first electric wire member (11) and a second holding member (30) that holds a second electric wire member (12). The second holding member (30) is attachable to and detachable from the first holding member (20).

13 Claims, 5 Drawing Sheets

(56) References Cited

FOREIGN PATENT DOCUMENTS

| | | | | |
|---|---|---|---|---|
| JP | 2011229232 | | * | 11/2011 |
| JP | 2014-137857 | A | | 7/2014 |
| JP | 2014137857 | | * | 7/2014 |
| JP | 2017-103994 | A | | 6/2017 |
| JP | 2017-112717 | A | | 6/2017 |
| JP | 2017103994 | | * | 6/2017 |

* cited by examiner

WIRE HARNESS FIXING DEVICE AND WIRE HARNESS

CROSS REFERENCE TO RELATED APPLICATIONS

This application is a national phase of PCT application No. PCT/JP2023/017823, filed on 12 May 2023, which claims priority from Japanese patent application No. 2022-079035, filed on 12 May 2022, all of which are incorporated herein by reference.

TECHNICAL FIELD

The present disclosure relates to a wire harness fixing device and a wire harness.

BACKGROUND

For example, the wire harness fixing device described in Patent Document 1 includes a fixed part that is fixed to a vehicle body panel or the like, and a holding part that holds electric wire members. The electric wire members are arranged by this fixing device along the vehicle body panel.

PRIOR ART DOCUMENT

Patent Document

Patent Document 1: JP H07-322449 A

SUMMARY OF THE INVENTION

Problems to be Solved

The configuration of electric wire members required for a vehicle, such as the type and number, varies depending on differences in vehicle equipment according to the grade of the vehicle, the presence or absence of selected optional items, and the like. For this reason, the present inventor has studied how the configuration of the electric wire members can be easily changed.

An object of the present disclosure is to provide a wire harness fixing device and a wire harness in which the configuration of electric wire members can be easily changed.

Means to Solve the Problem

A wire harness fixing device according to an aspect of the present disclosure includes a first holding member that holds a first electric wire member and a second holding member that holds a second electric wire member, and the second holding member is attachable to and detachable from the first holding member.

A wire harness according to an aspect of the present disclosure includes the above-described wire harness fixing device, a first electric wire member that is held by the first holding member of the wire harness fixing device, and a second electric wire member that is held by the second holding member of the wire harness fixing device.

Effect of the Invention

According to an aspect of the present disclosure, it is possible to provide a wire harness fixing device and a wire harness in which the configuration of electric wire members can be easily changed.

DETAILED DESCRIPTION TO EXECUTE THE INVENTION

Description of Embodiments of Present Disclosure

Figure 1:
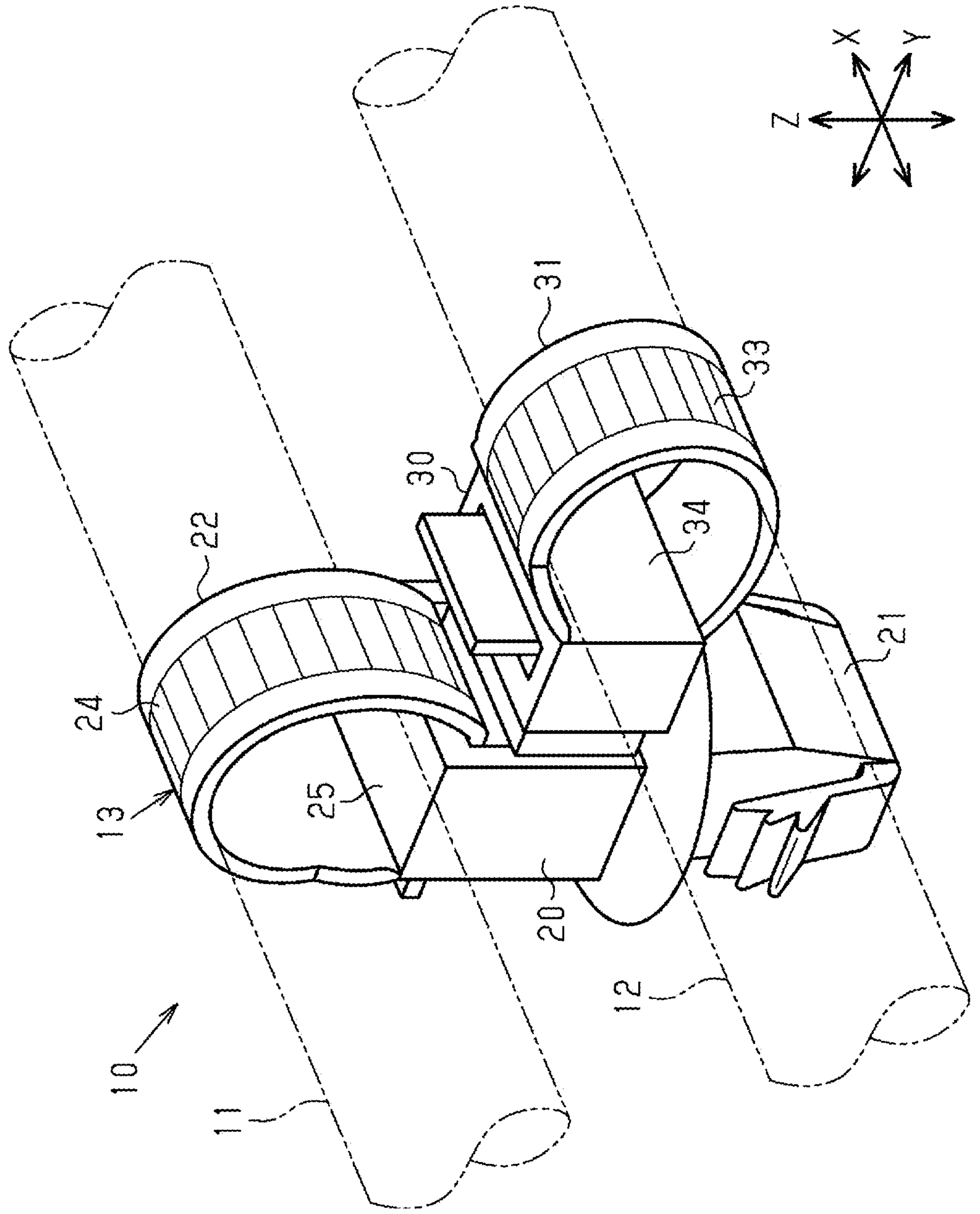
FIG. 1 is a perspective view of a wire harness in an embodiment.

First, embodiments of the present disclosure will be listed and described.

[1] A wire harness fixing device of the present disclosure includes a first holding member that holds a first electric wire member, and a second holding member that holds a second electric wire member, and the second holding member is attachable to and detachable from the first holding member.

With this configuration, after removing the second holding member and the second electric wire member from the first holding member that is fixed to a target object, it is possible to fix the second holding member holding a new second electric wire member to the first holding member, for example. In addition, if the first electric wire member is a standard-grade electric wire member and the second electric wire member is an electric wire member corresponding to an optional function, for example, it is possible to correspond to whether or not the option has been selected by attaching and detaching the second holding member. In this manner, the above-described wire harness fixing device makes it possible to easily change the configuration of the electric wire members.

[2] In the above [1], the first holding member may have a fixed part that is fixed to an attachment target and an electric wire holding part that holds the first electric wire member.

This configuration makes it possible to attach and detach the second holding member to and from the first holding member that is fixed to the attachment target.

[3] In the above [2], the electric wire holding part may be inseparable from the fixed part.

This configuration makes it possible to attach and detach the second holding member to and from the first holding member in which the electric wire holding part is inseparable from the fixed part.

[4] In any of the above [1] to [3], one of the first holding member and the second holding member may have an engaging part, the other of the first holding member and the second holding member may have an engaged part with which the engaging part engages, and the second holding member may be fixed to the first holding member by engagement between the engaging part and the engaged part.

This configuration makes the second holding member attachable to and detachable from the first holding member by the engagement between the engaging part and the engaged part.

[5] In the above [4], the engaged part may have an insertion hole, and the engaging part may have a pillar portion that is inserted into the insertion hole and a protruding portion that protrudes from the pillar portion and is locked to the engaged part in a counter-insertion direction.

This configuration makes it possible to make the engaging part attachable to and detachable from the engaged part.

[6] In the above [5], a plurality of the engaging parts and a plurality of the insertion holes may be provided.

With this configuration, the second holding member can be firmly fixed to the first holding member by the plurality of sets of engaging parts and engaged parts.

[7] In any of the above [4] to [6], the engaged part may have an insertion hole into which the engaging part is inserted, and the engaged part may be provided in the first holding member.

This configuration makes it possible to, when the first holding member is used without the second holding member attached, prevent the engaged part from interfering with surrounding components.

[8] In any of the above [5] to [7], the protruding portion may have a plate-like shape that is elastically deformable in a direction along the insertion direction with respect to the insertion hole.

With this configuration, the engaging part including the protruding portion can be suitably attached to and detached from the engaged part.

[9] In any of the above [5] to [7], the protruding portion may form a spherical or ellipsoidal shape.

With this configuration, the engaging part including the protruding portion can be suitably attached to and detached from the engaged part.

[10] In any of the above [5] to [9], the protruding portion may be integrally formed with the pillar portion.

This configuration makes it possible to improve the locking strength of the protruding portion to the engaged part.

[11] In any of the above [5] to [9], the protruding portion may be configured separately from the pillar portion.

This configuration makes it possible to improve the formability of the engaging part including the protruding portion.

[12] In any of the above [4] to [11], the first holding member may have a fixed part that is fixed to an attachment target and an electric wire holding part that holds the first electric wire member, the electric wire holding part may have a band portion that surrounds an outer periphery of the first electric wire member and a lock portion by which the band portion is locked, and in the first holding member, the engaging part or the engaged part may be provided between the lock portion and the fixed part.

This configuration makes it possible to preferably configure the engaging part or the engaged part in the first holding member.

[13] In the above [1], the first holding member may be a binding member that binds an electric wire bundle of the first electric wire member.

This configuration makes it possible to attach and detach the second holding member to and from the binding member.

[14] In the above [13], the binding member may be an adhesive tape that is wound around an outer periphery of the electric wire bundle.

This configuration makes it possible to attach and detach the second holding member to and from the adhesive tape.

[15] A wire harness according to the present disclosure includes the wire harness fixing device according to any one of the above [1] to [14], a first electric wire member that is held by the first holding member of the wire harness fixing device, and a second electric wire member that is held by the second holding member of the wire harness fixing device.

This configuration makes it possible to obtain the same advantageous effect as that of the wire harness fixing device in the above [1].

Details of Embodiments of Present Disclosure

Specific examples of a wire harness fixing device and a wire harness of the present disclosure will be described below with reference to the drawings. In each drawing, for convenience of description, a part of the configuration may be exaggerated or simplified. The dimensional ratio of each part may differ among the drawings. The terms "parallel" and "perpendicular" herein do not only mean strictly parallel or perpendicular, but also include roughly parallel or perpendicular within the range in which the operations and effects of the present embodiment can be achieved.

As shown in FIG. 1, a wire harness 10 of the present embodiment includes a first electric wire member 11, a second electric wire member 12, and a wire harness fixing device 13. The wire harness fixing device 13 has a first holding member 20 and a second holding member 30. The first electric wire member 11 is held by the first holding member 20. The second electric wire member 12 is held by the second holding member 30. The second holding member 30 is attachable to and detachable from the first holding member 20.

Each of the first electric wire member 11 and the second electric wire member 12 may be a bundle of a plurality of electric wires or may include an electric wire bundle, for example. Each of the first electric wire member 11 and the second electric wire member 12 may include a cylindrical exterior member that covers the outer periphery of the electric wire bundle.

(Configuration of First Holding Member 20)

Figure 2:
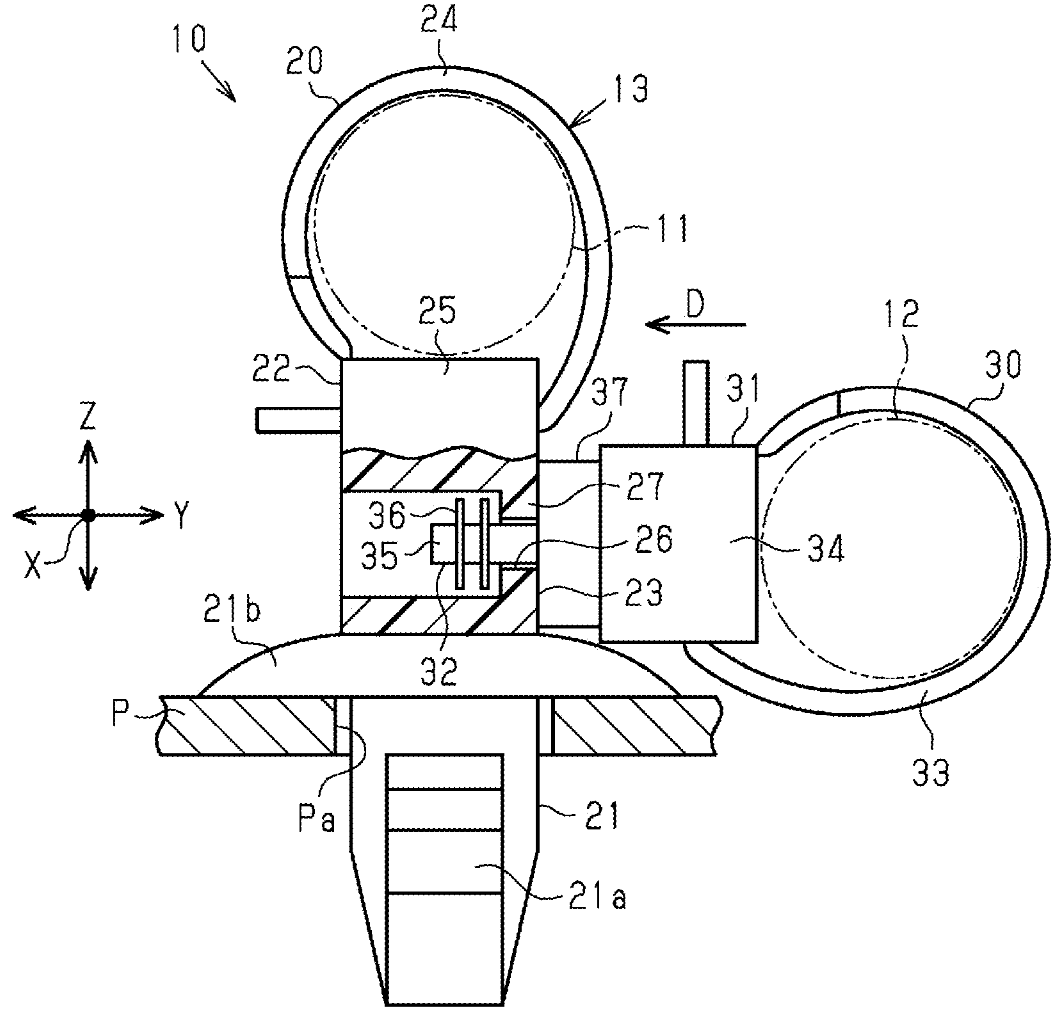
FIG. 2 is a schematic diagram of the wire harness in the same embodiment.

As shown in FIG. 2, the first holding member 20 has a fixed part 21 that is fixed to a vehicle body panel P as an attachment target, a first electric wire holding part 22 that holds the first electric wire member 11, and an engaged part 23. The first holding member 20 is formed from a synthetic resin, for example. The first holding member 20 is an injection-molded article in which the fixed part 21, the first electric wire holding part 22, and the engaged part 23 are integrally formed, for example. That is, the first electric wire holding part 22 is unattachable to and undetachable from the fixed part 21.

The fixed part 21 is fixed by being inserted into an attachment hole Pa that is formed through the vehicle body panel P, for example. The fixed part 21 includes a pair of projecting pieces 21*a* and a flange portion 21*b*, for example. The flange portion 21*b* is a suction cup-shaped portion, for example. The fixed part 21 sandwiches the vehicle body panel P between the projecting pieces 21*a* and the flange portion 21*b*. In this manner, the fixed part 21 is fixed to the vehicle body panel P.

As shown in FIGS. 1 and 2, the first electric wire holding part 22 has a band portion 24 that surrounds the outer periphery of the first electric wire member 11, and a lock portion 25 by which the band portion 24 is locked. The lock portion 25 is formed at one end in the length direction of the band portion 24. The band portion 24 is wrapped around the first electric wire member 11, and a leading end of the band portion 24 is inserted into and locked to the lock portion 25. In this manner, the first electric wire member 11 is held by the band portion 24 and the lock portion 25.

(Configuration of Engaged Part 23)

Figure 3:
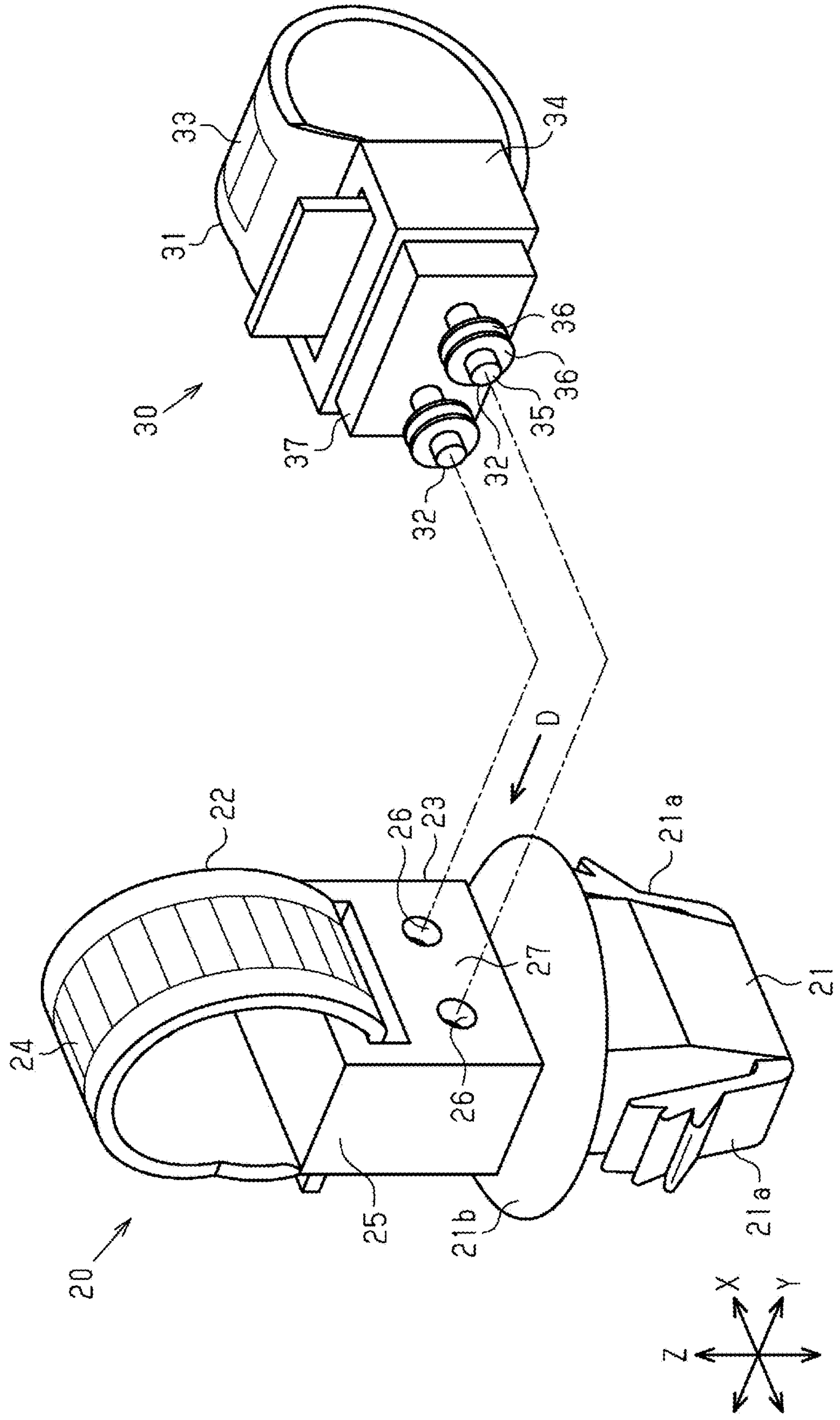
FIG. 3 is an exploded perspective view of a wire harness fixing device in the same embodiment.

As shown in FIGS. 2 and 3, the engaged part 23 is provided between the lock portion 25 and the fixed part 21. The engaged part 23 is connected to the lock portion 25 and the flange portion 21*b*, for example. The engaged part 23 includes a wall portion 27 having an insertion hole 26. For example, two insertion holes 26 are provided in the wall portion 27. In the drawings, the X axis is an axis along the length direction of the first electric wire member 11. The Y axis is an axis perpendicular to the X axis and parallel to the surface of the vehicle body panel P. The Z axis is an axis along the height direction of the first holding member 20 and perpendicular to both the X axis and the Y axis. For example, the wall portion 27 is a wall perpendicular to the Y axis, and the insertion holes 26 pass through the wall portion 27 along the Y axis.

(Configuration of Second Holding Member 30)

The second holding member 30 includes a second electric wire holding part 31 that holds the second electric wire member 12, and an engaging part 32 that engages with the engaged part 23. The second holding member 30 is formed from a synthetic resin, for example. The second holding member 30 is an injection-molded article in which the second electric wire holding part 31 and the engaging part 32 are integrally formed, for example. For example, two engaging parts 32 are provided. The engaging parts 32 are attachable to and detachable from the engaged part 23 of the first holding member 20.

As shown in FIGS. 1 and 2, the second electric wire holding part 31 has a band portion 33 that surrounds the outer periphery of the second electric wire member 12, and a lock portion 34 by which the band portion 33 is locked. The lock portion 34 is formed at one end in the length direction of the band portion 33. The band portion 33 is wrapped around the second electric wire member 12, and a leading end of the band portion 33 is inserted into and locked to the lock portion 34. In this manner, the second electric wire member 12 is held by the band portion 33 and the lock portion 34.

(Configuration of Engaging Part 32)

As shown in FIGS. 2 and 3, the engaging part 32 has a pillar portion 35 that is inserted into the insertion hole 26, and a protruding portion 36 that protrudes from the pillar portion 35. The pillar portion 35 extends along the Y axis from a base portion 37 that is integrally formed with the lock portion 34, for example. The protruding portion 36 protrudes in the radial direction of the pillar portion 35 in a direction perpendicular to the extending direction of the pillar portion 35, for example. For example, two protruding portions 36 are provided. The protruding portions 36 are integrally formed with the pillar portion 35, for example.

The protruding portions 36 are in the form of a plate that is elastically deformable in a direction along an insertion direction D with respect to the insertion holes 26, for example. The insertion direction D with respect to the insertion holes 26 is a direction along the Y axis. The protruding portions 36 are in the form of a plate that is perpendicular to or intersects with the insertion direction D so as to bend in a direction along the insertion direction D. The plate thickness of the protruding portions 36 in the insertion direction D is made small so as to bend suitably in the direction along the insertion direction D.

The engaging parts 32 are inserted into the insertion holes 26. When the engaging parts 32 are respectively inserted into the insertion holes 26, the protruding portions 36 pass through the insertion holes 26 while bending. After passing through the insertion holes 26, the protruding portions 36 elastically return to their original shape. Accordingly, the protruding portions 36 are locked to the wall portion 27 of the engaged part 23 in a counter-insertion direction. The counter-insertion direction is a direction opposite to the insertion direction D and along the Y axis. The second holding member 30 is fixed to the first holding member 20 by the engagement between the engaging parts 32 and the wall portion 27 of the engaged part 23.

The operations of the present embodiment will be described.

The second holding member 30 that holds the second electric wire member 12 is attachable to and detachable from the first holding member 20 that holds the first electric wire member 11. Therefore, it is possible to remove the second electric wire member 12 from the first holding member 20 without removing the first holding member 20 from the vehicle body panel P. In addition, since the second holding member 30 is attachable to the first holding member 20 that is fixed to the vehicle body panel P, the second electric wire member 12 can be easily replaced.

The advantageous effects of the present embodiment will be described.

(1) The second holding member 30 that holds the second electric wire member 12 is attachable to and detachable from the first holding member 20 that holds the first electric wire member 11. With this configuration, after removing the second holding member 30 and the second electric wire member 12 from the first holding member 20 that is fixed to the vehicle body panel P, it is possible to newly fix the second holding member 30 holding another second electric wire member 12 with different specifications to the first holding member 20, for example. In addition, if the first electric wire member 11 is a standard grade electric wire member and the second electric wire member 12 is an electric wire member corresponding to an optional function, for example, it is possible to correspond to whether or not the option has been selected by attaching and detaching the second holding member 30. It is also possible to reuse the second holding member 30 and the second electric wire member 12 removed from the first holding member 20, in another vehicle. As above, the wire harness fixing device 13 makes it possible to easily change the configuration of the electric wire members mounted on the vehicle.

(2) The first holding member 20 includes the fixed part 21 that is fixed to the vehicle body panel P as the attachment target, and the first electric wire holding part 22 that holds the first electric wire member 11. This configuration makes it possible to attach and detach the second holding member 30 to and from the first holding member 20 that is fixed to the vehicle body panel P.

(3) The first electric wire holding part 22 is inseparable from the fixed part 21. This configuration makes it possible to attach and detach the second holding member 30 to and from the first holding member 20 in which the first electric wire holding part 22 is inseparable from the fixed part 21.

(4) The second holding member 30 is fixed to the first holding member 20 by engagement between the engaging part 32 and the engaged part 23. With this configuration, the second holding member 30 can be made attachable to and detachable from the first holding member 20 by the engaging part 32 and the engaged part 23.

(5) The engaged part 23 has the insertion hole 26. The engaging part 32 has the pillar portion 35 that is inserted into the insertion hole 26, and the protruding portion 36 that protrudes from the pillar portion 35 and is locked with the engaged part 23 in the counter-insertion direction. With this configuration, the engaging part 32 can be made attachable to and detachable from the engaged part 23.

(6) There are a plurality of engaging parts 32 and a plurality of insertion holes 26. With this configuration, the second holding member 30 can be firmly fixed to the first holding member 20 by the plurality of sets of engaging parts 32 and insertion holes 26.

(7) The second holding member 30 has the engaging part 32. The first holding member 20 has the engaged part 23 with which the engaging part 32 engages. Since the engaged part 23 provided in the first holding member 20 has the insertion hole 26, it is possible to avoid the engaged part 23 from interfering with surrounding components when the first holding member 20 is used without the second holding member 30 attached.

(8) The protruding portion 36 has a plate-like shape that is elastically deformable in the direction along the insertion direction D with respect to the insertion hole 26. With this configuration, when the engaging part 32 is inserted into or pulled out of the insertion hole 26, the protruding portion 36 hits the wall portion 27 and elastically deforms. This makes it possible to reduce the force required to insert or pull the engaging part 32 into or out of the insertion hole 26. As a result, the engaging part 32 including the protruding portion 36 can be suitably attached to and detached from the engaged part 23.

(9) The protruding portion 36 is integrally formed with the pillar portion 35. This configuration makes it possible to improve the locking strength of the protruding portion 36 to the engaged part 23.

(10) One engaging part 32 is provided with a plurality of protruding portions 36. This makes it possible to suppress the engaging part 32 from falling off from the engaged part 23.

(11) The first electric wire holding part 22 has the band portion 24 that surrounds the outer periphery of the first electric wire member 11 and the lock portion 25 by which the band portion 24 is locked. In the first holding member 20, the engaged part 23 is provided between the lock portion 25 and the fixed part 21. With this configuration, the engaging part 32 can be preferably configured in the first holding member 20.

The present embodiment can be modified as follows. The present embodiment and the following modified examples can be combined with each other to the extent that there is no technical contradiction.

Figure 4:
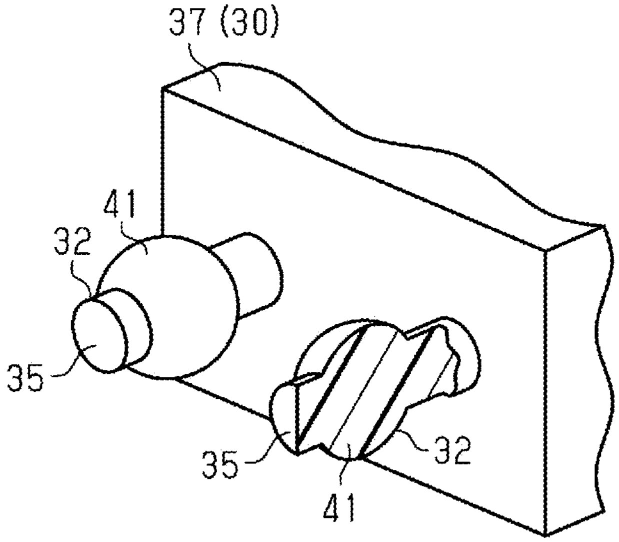
FIG. 4 is a schematic perspective view of a second holding member in the same embodiment.
Figure 5:
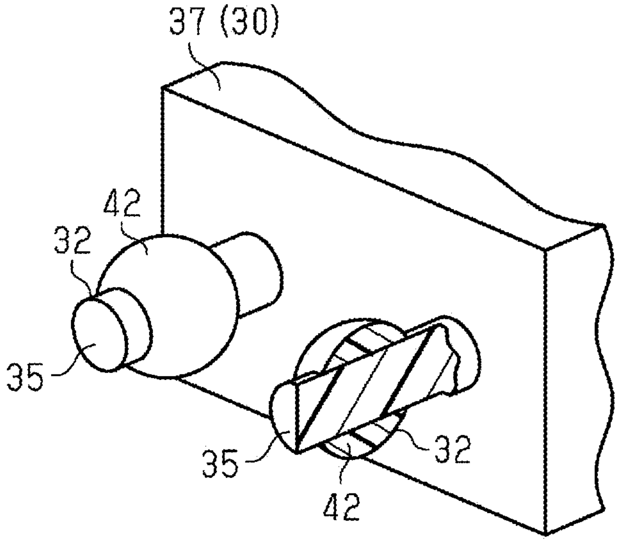
FIG. 5 is a schematic perspective view of the second holding member in the same embodiment.

In the engaging part 32 of the above embodiment, the protruding portion 36 can be changed to a protruding portion 41 shown in FIG. 4 or a protruding portion 42 shown in FIG. 5, for example. The protruding portions 41 and 42 have a spherical or ellipsoidal shape. That is, the surfaces of the protruding portions 41 and 42 are spherical. With this configuration, the engaging part 32 including the protruding portion 41 or the protruding portion 42 can be suitably attached to and detached from the engaged part 23. As shown in FIG. 4, the protruding portion 41 is integrally formed with the pillar portion 35. This improves the locking strength of the protruding portion 41 to the engaged part 23.

As shown in FIG. 5, the protruding portion 42 is configured as a separate body from the pillar portion 35. More specifically, in the engaging part 32, only the pillar portion 35 is formed integrally with the base portion 37. The engaging part 32 shown in FIG. 5 is formed by attaching the protruding portion 42, which is formed separately from the pillar portion 35, to the pillar portion 35. This configuration improves the formability of the engaging part 32.

In the engaged part 23, the wall portion 27 may be a wall perpendicular to the Z axis, and the insertion hole 26 may pass through the wall portion 27 along the Z axis, for example. The wall portion 27 may be a wall perpendicular to the X axis, and the insertion hole 26 may pass through the wall portion 27 along the X axis, for example. The wall portion 27 may be a wall inclined with respect to the Z axis, and the insertion hole 26 may be opened in an oblique direction with respect to the Z axis, for example.

The number of the insertion holes 26 is not limited to that in the above embodiment and may be one or three or more.

The number of the engaging parts 32 is not limited to that in the above embodiment and may be one or three or more.

The number of the protruding portions 36 provided in one engaging part 32 is not limited to that in the above embodiment and may be one or three or more.

The first holding member 20 may have the engaging part 32, and the second holding member 30 may have the engaged part 23.

The configurations of the first electric wire holding part 22 and the second electric wire holding part 31 are not limited to those in the above embodiment, and may be changed as appropriate depending on the configuration. The configuration of the fixed part 21 is not limited to that in the above embodiment, and may be changed as appropriate depending on the configuration.

Figure 6:
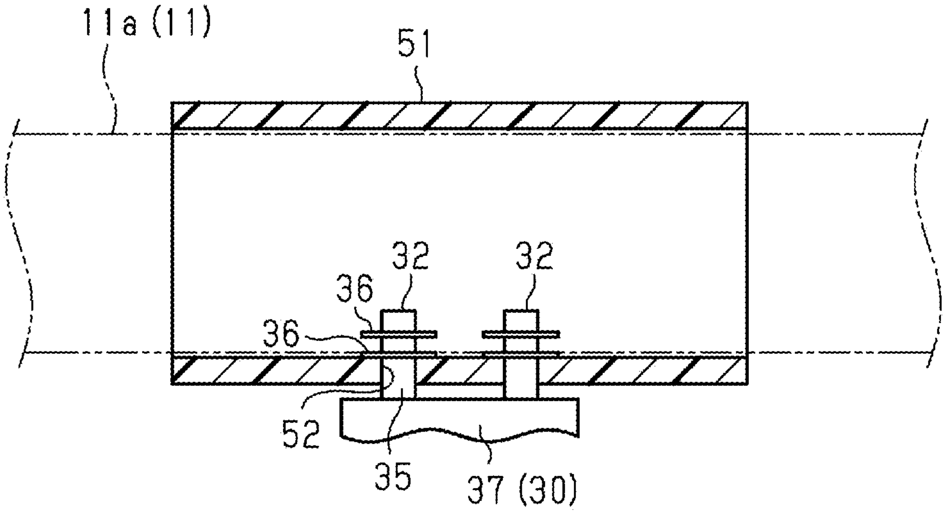
FIG. 6 is a schematic diagram of the wire harness in the same embodiment.

The first holding member 20 can be changed to a binding member 51 shown in FIG. 6. The binding member 51 is a member that binds an electric wire bundle 11*a* of the first electric wire member 11. The binding member 51 is an adhesive tape that is wound around the outer periphery of the electric wire bundle 11*a*, for example. The material of the binding member 51 may be a resin material such as polyvinyl chloride (PVC), polypropylene (PP), or polyethylene terephthalate (PET), for example.

The pillar portion 35 of the second holding member 30 passes through a through hole 52 formed in the binding member 51. The through hole 52 is formed by breaking through the binding member 51 with the pillar portion 35, for example. After passing through the through hole 52, the protruding portion 36 of the engaging part 32 elastically returns to its original shape. Accordingly, the protruding portion 36 is locked on the inner peripheral surface of the binding member 51. The second holding member 30 is held by the binding member 51 as the protruding portion 36 is locked to the binding member 51. This configuration makes it possible to attach and detach the second holding member 30 to and from the binding member 51 that binds the electric wire bundle 11*a*.

The fixed part 21 in the illustrated embodiment can include the flange portion 21*b* and a leg or plug configured to be inserted into the attachment hole Pa of the body panel P. The flange portion 21*b* can include a first flange surface configured to directly contact the attachment surface of the body panel P and a second flange surface opposite to the first flange surface. The leg or plug may extend from the first flange surface of the flange portion 21*b*. The leg or plug may include the projecting piece 21*a* in the illustrated embodiment.

The engaged part 23, the lock portion 25, the insertion hole 26, and the wall portion 27 in the illustrated embodiment may be configured as a part of a first base block that protrudes from the second flange surface of the flange portion 21*b*. The first base block may include a seat surface that supports the first electric wire member 11. The first base block may cooperate with the band portion 24 in the illustrated embodiment to hold the first electric wire member 11 and position the first electric wire member 11 with respect to the body panel P.

The lock portion 34 and the base portion 37 in the illustrated embodiment may be configured as a part of a second base block that is attachable to and detachable from the first base block. The second base block may include a seat surface that supports the second electric wire member 12. The second base block may cooperate with the band portion 33 in the illustrated embodiment to hold the second electric wire member 12 and position the second electric wire member 12 with respect to the body panel P and the first electric wire member 11.

The first base block may support the second base block in a retrofittable manner with a friction engagement structure in between, which may be a recess and projection engagement structure, for example. In one example, the friction engagement structure may be configured such that the second base block retrofitted to the first base block is removable from the first base block. In one example, the first base block may support the second base block in a reversibly removable manner.

Some implementation examples of the present disclosure are directed to a wire harness fixing device. The wire harness fixing device can be used together with an attachment target that has an attachment hole that may be a through hole, and the attachment target may be a part of a vehicle. The wire harness fixing device may include: a flange portion that has a first flange surface configured to directly contact an attachment surface of the attachment target and a second flange surface that is opposite to the first flange surface; a plug that extends from the first flange surface of the flange portion; a first base block that extends from the second flange surface of the flange portion; and a first electric wire holding band that cooperates with the first base block to hold a first electric wire member and position the first electric wire member with respect to the attachment target. The first base block may support a second base block for holding a second electric wire member different from the first electric wire member in a retrofittable manner. The first base block may support the second base block with a friction engagement structure that may be a recess and projection engagement structure in between, for example.

The embodiments and modifications disclosed herein should be considered to be illustrative and the present invention is not limited to these examples. The scope of the present invention is indicated by the scope of claims, and is intended to include all modifications within a meaning and scope equivalent to the scope of claims.

LIST OF REFERENCE NUMERALS

10 Wire harness
11 First electric wire member
11*a* Electric wire bundle
12 Second electric wire member
13 Wire harness fixing device
20 First holding member
21 Fixed part
21*a* Projecting piece
21*b* Flange portion
22 First electric wire holding part (electric wire holding part)
23 Engaged part
24 Band portion
25 Lock portion
26 Insertion hole
27 Wall portion
30 Second holding member
31 Second electric wire holding part
32 Engaging part
33 Band portion
34 Lock portion
35 Pillar portion
36 Protruding portion
37 Base portion
41,42 Protruding portion
51 Binding member (first holding member, adhesive tape)
52 Through hole
D Insertion direction
P Vehicle body panel (attachment target)
Pa Attachment hole

What is claimed is:

1. A wire harness fixing device comprising:

a first holding member that holds a first electric wire member; and a second holding member that holds a second electric wire member, wherein:

the second holding member is attachable to and detachable from the first holding member, one of the first holding member and the second holding member has an engaging part, the other of the first holding member and the second holding member has an engaged part with which the engaging part engages, the second holding member is fixed to the first holding member by engagement between the engaging part and the engaged part, the engaged part has an insertion hole, and the engaging part has a pillar portion that is inserted into the insertion hole and a protruding portion that protrudes from the pillar portion and is locked to the engaged part in a counter-insertion direction.

2. The wire harness fixing device according to claim 1, wherein the first holding member has a fixed part that is fixed to an attachment target and an electric wire holding part that holds the first electric wire member.

3. The wire harness fixing device according to claim 2, wherein the electric wire holding part is inseparable from the fixed part.

4. The wire harness fixing device according to claim 1, wherein a plurality of the engaging parts and a plurality of the insertion holes are provided.

5. The wire harness fixing device according to claim 1, wherein the engaged part has an insertion hole into which the engaging part is inserted, and the engaged part is provided in the first holding member.

6. The wire harness fixing device according to claim 1, wherein the protruding portion has a plate-like shape that is elastically deformable in a direction along the insertion direction with respect to the insertion hole.

7. The wire harness fixing device according to claim 1, wherein the protruding portion forms a spherical or ellipsoidal shape.

8. The wire harness fixing device according to claim 1, wherein the protruding portion is integrally formed with the pillar portion.

9. The wire harness fixing device according to claim 1, wherein the protruding portion is configured separately from the pillar portion.

10. The wire harness fixing device according to claim 1, wherein the first holding member has a fixed part that is fixed to an attachment target and an electric wire holding part that holds the first electric wire member, the electric wire holding part has a band portion that surrounds an outer periphery of the first electric wire member and a lock portion by which the band portion is locked, and in the first holding member, the engaging part or the engaged part is provided between the lock portion and the fixed part.

11. The wire harness fixing device according to claim 1, wherein the first holding member is a binding member that binds an electric wire bundle of the first electric wire member.

12. The wire harness fixing device according to claim 11, wherein the binding member is an adhesive tape that is wound around an outer periphery of the electric wire bundle.

13. A wire harness comprising:

the wire harness fixing device according to claim 1;

a first electric wire member that is held by the first holding member of the wire harness fixing device; and a second electric wire member that is held by the second holding member of the wire harness fixing device.

* * * * *